(12) United States Patent
Shionozaki

(10) Patent No.: US 6,496,479 B1
(45) Date of Patent: Dec. 17, 2002

(54) NETWORK RESOURCE RESERVATION CONTROL METHOD AND APPARATUS, RECEIVING TERMINAL, SENDING TERMINAL, AND RELAY APPARATUS

(75) Inventor: Atsushi Shionozaki, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/160,472

(22) Filed: Sep. 24, 1998

(30) Foreign Application Priority Data

Sep. 26, 1997 (JP) .............................................. 9-279826

(51) Int. Cl.⁷ ........................... G01R 31/08; H04J 1/16; H04J 3/14; G06F 11/00; G06F 15/16; H04L 1/00; H04L 12/26
(52) U.S. Cl. ....................................... 370/230; 709/229
(58) Field of Search ................................ 370/229, 230, 370/231–234; 709/200, 223, 226, 227, 228, 229

(56) References Cited

U.S. PATENT DOCUMENTS

| | | | |
|---|---|---|---|
| 5,258,979 A | | 11/1993 | Oomuro et al. |
| 5,699,532 A | * | 12/1997 | Barrett et al. ............. 370/395.3 |
| 5,903,559 A | * | 5/1999 | Acharya et al. ............. 370/254 |
| 5,943,337 A | * | 8/1999 | Sasagawa ................. 370/395.3 |
| 6,397,254 B1 | * | 5/2002 | Northrup ..................... 709/228 |

FOREIGN PATENT DOCUMENTS

EP 0 740 442 A2 10/1996

OTHER PUBLICATIONS

European Search Report dated Feb. 2, 2000, for EP Patent Application No. 98 11 8232.2–2209.

* cited by examiner

*Primary Examiner*—Kwang Bin Yao
*Assistant Examiner*—Kevin C. Harper
(74) *Attorney, Agent, or Firm*—Crosby, Heafey, Roach & May

(57) ABSTRACT

Resources such as VCs (Virtual Connections) are efficiently reserved. When an ASP (AMInet Setup Protocol) message is sent from a receiving terminal (RECEIVER) to a sending terminal (SENDER), virtual connections of a predetermined bandwidth individually specified by the ASP message are established in the direction from the receiving terminal to the sending terminal and in the direction from the sending terminal to the receiving terminal independently at an edge router, backbone routers, and an edge router in this order through which the ASP message passes.

26 Claims, 10 Drawing Sheets

ASP Prototype Implementation

ASP HEADR

Backbone Router

EXAMPLE OF NETWORK CONFIGURATION

ASP INTERNAL TABLE

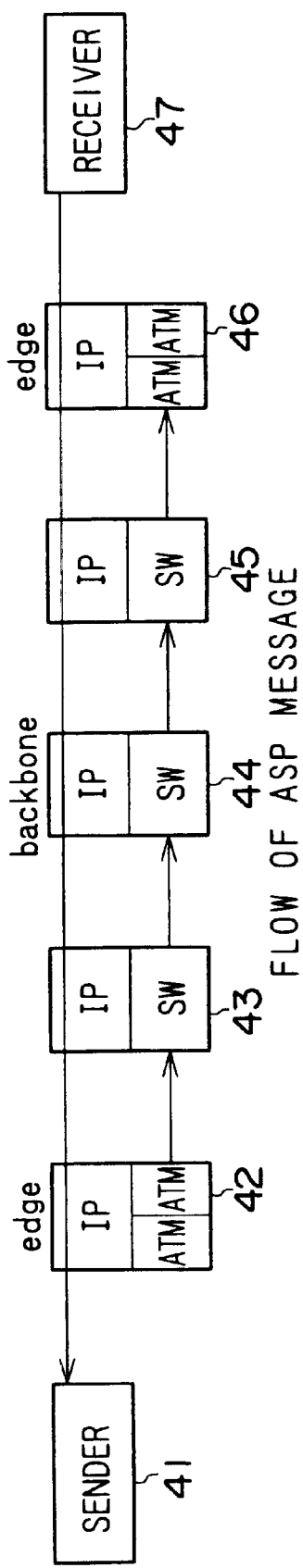
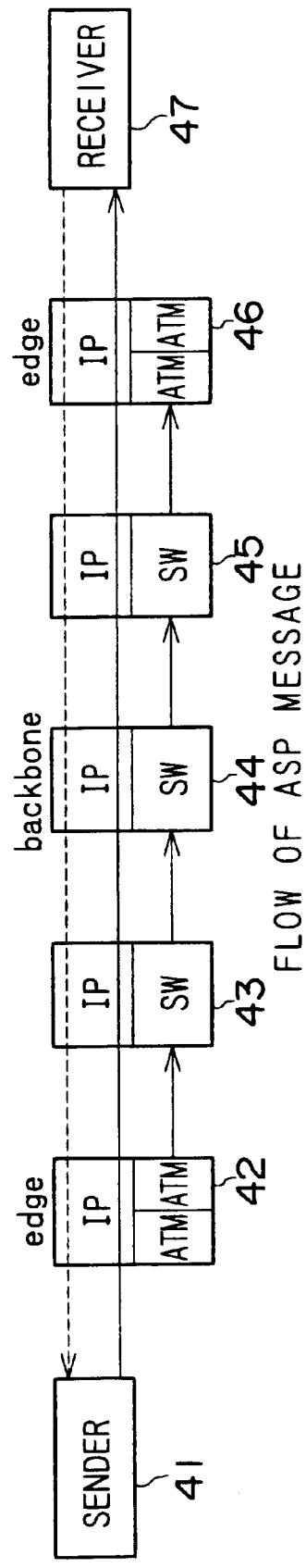

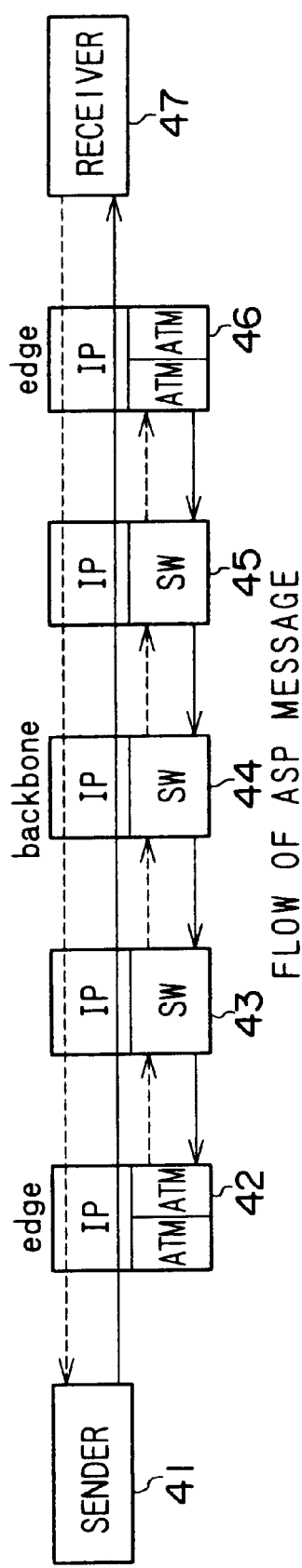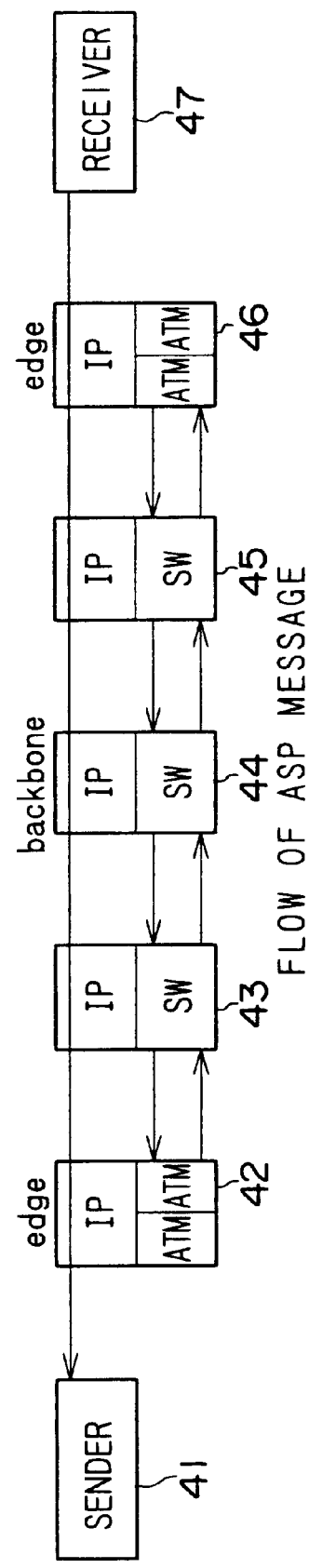

NETWORK RESOURCE RESERVATION CONTROL METHOD AND APPARATUS, RECEIVING TERMINAL, SENDING TERMINAL, AND RELAY APPARATUS

BACKGROUND OF THE INVENTION

The present invention generally relates to a network resource reservation control method, a network resource reservation control apparatus, a receiving terminal, a sending terminal, and a relay apparatus and, more particularly, to a network resource reservation control method, a network resource reservation control apparatus, a receiving terminal, a sending terminal, and a relay apparatus that are constituted so that both of the sending terminal and the receiving terminal can independently establish predetermined unidirectional or bidirectional virtual connection.

In building an IP (Internet Protocol) network by use of ATM (Asynchronous Transfer Mode), how to transmit connectionless IP packets by virtual connection (hereafter appropriately referred to as VC) of ATM, a connection-oriented technology, presents a problem to be solved.

Conventionally, RSVP (Resource Reservation Protocol) and ST-II (Stream Transport Protocol-II) are available as protocols for making a reservation of network resources such as virtual connection. RSVP allows a receiving side to establish connection while ST-II allows a sending side to establish connection.

However, in RSVP and ST-II, the establishment of connection can be made only in a unidirectional manner by either receiving side or sending side, sometimes causing a problem of inefficient connection establishment.

Further, RSVP and ST-II present another problem that resource requests from sending side to receiving side and vice versa cannot be made independently.

SUMMARY OF THE INVENTION

It is therefore an object of the present invention to allow both of the sending side and the receiving side to efficiently establish connection in various methods.

In carrying out the invention and according to one aspect thereof, there is provided a network resource reservation control method comprising the steps of: sending a message composed of first information for specifying, as a direction in which the resource reservation is performed, one of unidirectional communication in which the resource reservation is performed in a first direction from the sending terminal to the receiving terminal, a second direction from the receiving terminal to the sending terminal, or bidirectional communication in which the fist direction and the second direction are combined, and second information for independently requesting resources in the first direction and the second direction; and reserving the resource requested by the second information in the direction specified by the first information of the message sent in the sending step.

In carrying out the invention and according to another aspect thereof, there is provided a network resource reservation control apparatus comprising: a sender for sending a message composed of first information for specifying, as a direction in which the resource reservation is performed, one of unidirectional communication in which the resource reservation is performed in a first direction from the sending terminal to the receiving terminal, a second direction from the receiving terminal to the sending terminal, or bidirectional communication in which the first direction and the second direction are combined, and second information for independently requesting resources in the first direction and the second direction; and a resource reserving system for reserving the resource requested by the second information in the direction specified by the first information of the message sent by the sender.

In carrying out the invention and according to still another aspect thereof, there is provided a receiving terminal having a sender for sending a message to the sending terminal, the message being composed of first information for specifying, as a direction in which the resource reservation is performed, one of unidirectional communication in which the resource reservation is performed in a first direction from the sending terminal to the receiving terminal, a second direction from the receiving terminal to the sending terminal, or bidirectional communication in which the first direction and the second direction are combined, and second information for independently requesting resources in the first direction and the second direction.

In carrying out the invention and according to yet another aspect thereof, there is provided a sending terminal having a sender for sending a message to the receiving terminal, the message being composed of first information for specifying, as a direction in which the resource reservation is performed, one of unidirectional communication in which the resource reservation is performed in a first direction from the sending terminal to the receiving terminal, a second direction from the receiving terminal to the sending terminal, or bidirectional communication in which the first direction and the second direction are combined, and second information for independently requesting resources in the first direction and the second direction.

In carrying out the invention and according to a different aspect thereof, there is provided a relay apparatus comprising: a relay for relaying a message composed of first information for specifying, as a direction in which the resource reservation is performed, one of unidirectional communication in which the resource reservation is performed in a first direction from the sending terminal to the receiving terminal, a second direction from the receiving terminal to the sending terminal, or bidirectional communication in which the first direction and the second direction are combined, and second information for independently requesting resources in the first direction and the second direction; and a resource reserving system for reserving the resource requested by the second information in the direction specified by the first information of the message relayed by the relay.

In the network resource reservation control method and the network resource reservation control apparatus, a message is sent composed of first information for specifying, as a direction in which the resource reservation is performed, one of unidirectional communication in which the resource reservation is performed in a first direction from the sending terminal to the receiving terminal, a second direction from the receiving terminal to the sending terminal, or bidirectional communication in which the first direction and the second direction are combined, and second information for independently requesting resources in the first direction and the second direction. A resource requested by the second information is reserved in the direction specified by the first information of the sent message.

In the receiving terminal, the sender sends to the sending terminal the message composed of first information for specifying, as a direction in which the resource reservation is performed, one of unidirectional communication in which the resource reservation is performed in a first direction from the sending terminal to the receiving terminal, a second direction from the receiving terminal to the sending terminal, or bidirectional communication in which the first direction and the second direction are combined, and second information for independently requesting resources in the first direction and the second direction.

In the sending terminal, a sender sends to the receiving terminal the message composed of first information for specifying, as a direction in which the resource reservation is performed, one of unidirectional communication in which the resource reservation is performed in a first direction from the sending terminal to the receiving terminal, a second direction from the receiving terminal to the sending terminal, or bidirectional communication in which the first direction and the second direction are combined, and second information for independently requesting resources in the first direction and the second direction.

In the relay apparatus, the relay relays the message composed of first information for specifying, as a direction in which the resource reservation is performed, one of unidirectional communication in which the resource reservation is performed in a first direction from the sending terminal to the receiving terminal, a second direction from the receiving terminal to the sending terminal, or bidirectional communication in which the first direction and the second direction are combined, and second information for independently requesting resources in the first direction and the second direction; and the resource reserving system reserves the resource requested by the second information in the direction specified by the first information of the message relayed by the relay.

BRIEF DESCRIPTION OF THE DRAWINGS

These and other objects of the invention will be seen by reference to the description, taken in connection with the accompanying drawing, in which:

FIG. 11 is a diagram illustrating an ASP message flow and a procedure in which VC establishment is performed;

FIG. 12 is a diagram illustrating another ASP message flow and another procedure in which VC establishment is performed;

FIG. 15 is a diagram illustrating a different ASP message flow and a different procedure in which VC establishment is performed; and FIG. 16 is a diagram illustrating a still different ASP message flow and a still different procedure in which VC establishment is performed.

DETAILED DESCRIPTION OF PREFERRED EMBODIMENTS

Figure 1:
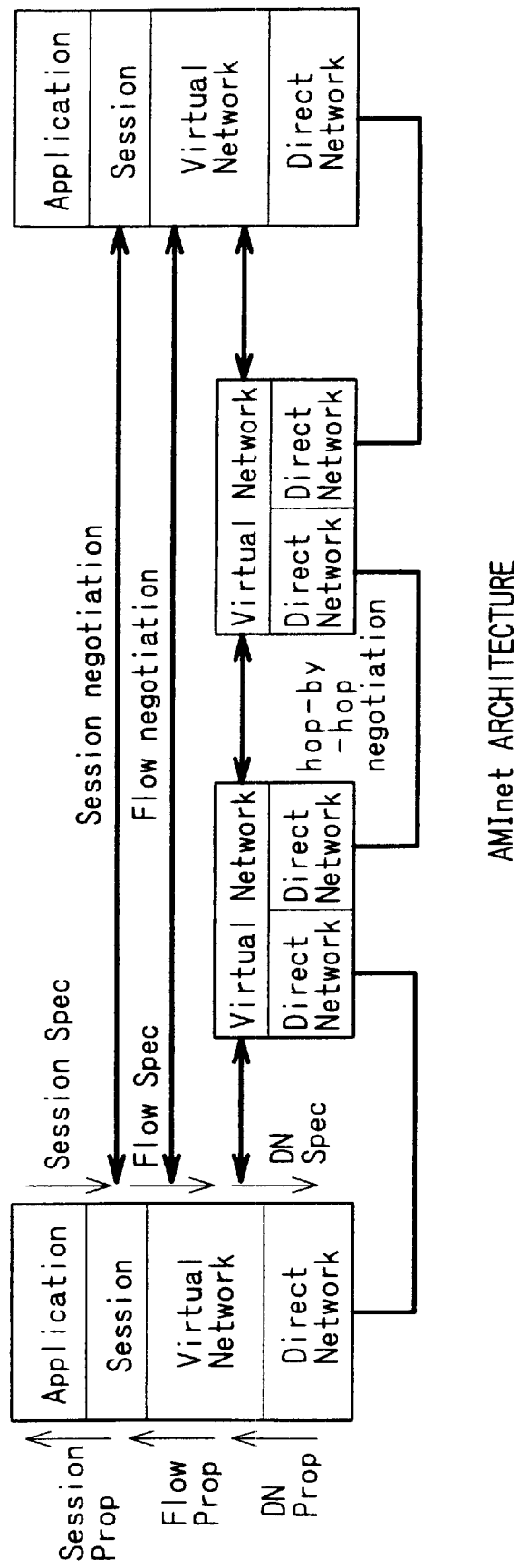
FIG. 1 is a schematic diagram illustrating an example of the AMInet architecture.

This invention will be described in further detail by way of example with reference to the accompanying drawings. To be described first will be AMInet under development by the applicant hereof and others that provides a wide-area high-speed network environment.

AMInet is a next-generation network architecture intended to solve problems involved in existing network architectures. AMInet features assurance of connection-oriented QoS (Quality of Service), multicast support, separation between identifier and address, control between non-ends, and dynamic construction of negotiation-based optimum protocol stack for example. Networks based on the AMInet architecture look ahead to the coming FTTH (Fiber to the Home) age, covering not only wide area backbones but also household networks.

Currently, new network architectures intended for an amalgam between communication and broadcasting is being sought. The OSI (Open System Interconnection) reference model and the Internet architecture were designed about 20 years ago, becoming incapable of coping with the requirements for realizing continuos media communication such as moving picture and voice, the requirements for mobility-transparent communication required by the emergence of mobile computing, and the effective use of ultra-high speed communication technologies represented by ATM (Asynchronous Transfer Mode).

The Internet is being expanded for satisfying and implementing the above-mentioned requirements and technologies. However, the Internet architecture involves the following limitations, making the above-mentioned problems insolvable:

IP (Internet Protocol) based datagram;
no consideration into data link characteristics;
no clear distinction between identifier and address; and
traffic control only between end nodes.

In the current state of connection to the Internet, large enterprises are constantly connected to the Internet through private lines. Small enterprises and home users are connected through dial-up-based intermittent connection. The line speed for constant connection is about at most 1.5 Mbps (megabits/second) and that for intermittent connection is limited to about 128 Kbps (kilobits/second). Simply converting the connection form from intermittent to constant significantly changes the Internet usage forms in homes and businesses. In addition, order-of-magnitude increases in line speed would produce applications unimaginable today.

With an eye toward the future in which houses and enterprises are constantly connected to ultra-high-speed networks in symmetrical/quasi-symmetrical manner by the realization of FTTH (T. Miki, Toward the Service-Rich Era. IEEE Communications Magazine, Vol. 32, No. 2, February 1994) and XDSL (G. T. Hawley, Systems Considerations for the Use of xDSL Technology for Data Access. IEEE Communications Magazine, Vol. 35, No. 3, March 1997), The AMInet architecture is intended to solve the essential problems involved in the Internet architecture. The following describes the AMInet architecture and its system model.

Increasing number of future applications will handle continuous media such as moving pictures and voices. Technologically, the quality of service (QoS) of available bandwidth, transmission delay, low jitter in transmission delay and error ratio must be assured.

On the other hand, the demands for the transfer of very-high-volume data such as medical images, newspapers, and movie films in their entirety would increase in the future. Such applications are required to transfer data as quickly as possible. Technologically, a so-called "long fat pipe" problem must be solved and a technology for effectively using the bands of ultra-high-speed networks must be developed.

Most current communication forms are based on one-to-one connection. Also required in the future are multicast communication for sending same data to two or more destinations and mobility-transparent communication with mobile users. In architecture, there is a problem of how to handle the relationship between identifier and address. Technologically, a scalable route control method must be established. Moreover, QoS assurance and high-speed high-capacity communication are required.

For computer networks to actually provide a communication infrastructure, strong security must be realized. AMInet secures the secrecy, tamper protection, authentication, and traffic analysis prevention between nodes. User authentication for example is controlled by application programs and therefore out of the scope of AMInet.

Even if a network having the above-mentioned features is built, lack of the compatibility with the existing Internet cannot realize smooth migration of users to the network. It is required for this type of network to be transparent to the users; namely this network must make the users unaware of whether the network they are using is an AMInet network or the existing Internet.

The following shows the features of the AMInet architecture in contrast with the drawbacks of the Internet:
dynamic construction of optimum protocol stack;
a negotiation between the layers of the same level between nodes and between upper and lower levels in a node;
connection-oriented QoS assurance;
separation between node identifier and address;
control between non-ends; and
architecture independent of communication medium.

If the OSI hierarchical model is followed, one layer abstracts the capabilities of the layer below it, covering the details of the lower layer. An actual wide-area network is composed of various data links having different characteristics. In the case of a mobile node, data link characteristics may change during communication. A negotiation between upper and lower layers allows an upper layer to know the characteristics and states of lower layers, realizing dynamic adaptation to a communication environment.

If the protocol stack is fixed, same capabilities may be executed in a duplicate manner between different layers, causing waste. In AMInet, an optimum protocol stack is built dynamically. For example, if all data links between end nodes ensures reliability, the capability of ensuring reliability in the transport layer may be omitted. Also, if a certain portion along a communication route has a different data link characteristic than other portions as with the case where a node connected by a wireless LAN communicates with another node in a wide area network, a special protocol stack can be formed for the nodes on only both sides of the different data link to assimilate the data link characteristic differences, thus enhancing the efficiency in end-to-end communication.

A negotiation is used for building an optimum protocol stack. Normally, a negotiation is performed between the layers of the same level between nodes. In AMInet, a negotiation is also performed between the upper and lower layers in a node.

The Internet is built on an IP datagram and therefore has no concept of clearly establishing logical connection in the network layer even for ensuring QoS. This is because the Internet lays emphasis upon the resistance to network failures. On the contrary, AMInet attaches importance to QoS and, in order to assure the same, uses logical connection positively.

In the Internet, an IP address represents a node location and, at the same time, provides a node identifier. Hence, no mobility-transparent communication can be carried out with a mobile node in the Internet. This also complicates the processing for providing security. In IPv6, which is a next-generation IP, there was much heated debate about node identifier but the concept did not come to be employed. In AMInet, clear distinction between node identifier and node address is provided to realize mobility-transparent communication (F. Teraoka, K. Uehara, H. Sunahara, and J. Murai, VIP: A Protocol Providing Host Mobility, CACM, Vol. 37, No. 8, August 1994), thereby mitigating the load of security processing.

In addition, in the Internet, flow control, error recovery, and congestion control are performed on the transport layer of an end node. For congestion control, congestion recovery is considered to be made more effectively between a congested node (router) and a sending node.

Common to AMInet and the Internet is the introduction of a layer shared by all nodes to make the architecture independent of the data link. To maintain the compatibility with the Internet, AMInet also substantially employs IPs (v4 and v6) as the so-called network layer. However, because the dynamic construction of the protocol stack, the IP layer may sometimes bypassed in data communication.

The following describes the protocol layer. As described above, AMInet builds the protocol stack dynamically. A hierarchical representation of the protocol modules classified functionally is as shown in FIG. 1. The bottom is a direct network layer. This layer provides a node-to-node communications capability of "direct" communication through a single transmission medium. This layer is equivalent to the physical layer and the data link layer of the OSI reference model. To be more specific, this layer corresponds to the protocol of Ethernet and ATM.

FIG. 1 shows the AMInet architecture, in which a virtual network layer rests on the direct network layer. The virtual network layer makes a network composed of plural transmission media virtually appear one transmission medium to provide a communications capability between the nodes connected to this network. The dynamic construction of the protocol stack is performed on this layer. The virtual network layer is equivalent to the network layer and the transport layer of the OSI reference model.

A session layer comes above the virtual network layer. The session layer abstracts the communications capability provided by the network layer and provides a result of the abstraction to an application layer laid on top of the AMInet architecture. This session layer is functionally different from the session layer of the OSI reference model. The abstraction makes specifiable a QoS parameter by other than numeric values, like "TV-quality moving picture," specifiable a mate of communication not by node address nor node identifier but by a service name, and makes, if a connection in the virtual network layer is temporarily interrupted by failure or node movement, the connection appear as if it were still continued. The topmost application layer is outside the scope of the AMInet project.

Referring to FIG. 1, each horizontal arrow denotes a negotiation between layers of the same level. Each vertical arrow denotes a negotiation between layers of different levels. The negotiations between layers of the same level include a session negotiation and flow negotiation to be performed between end nodes and a hop-by-hop negotiation to be performed between adjacent nodes. The negotiations between layers of different levels include a request to be issued from a higher layer to a lower layer and an indication of a state of a lower layer to be transmitted to a higher layer. These negotiations provide information about the communications environment between end nodes and the characteristics of the direct network layer, supporting the construction of an optimum protocol stack.

Figure 2:
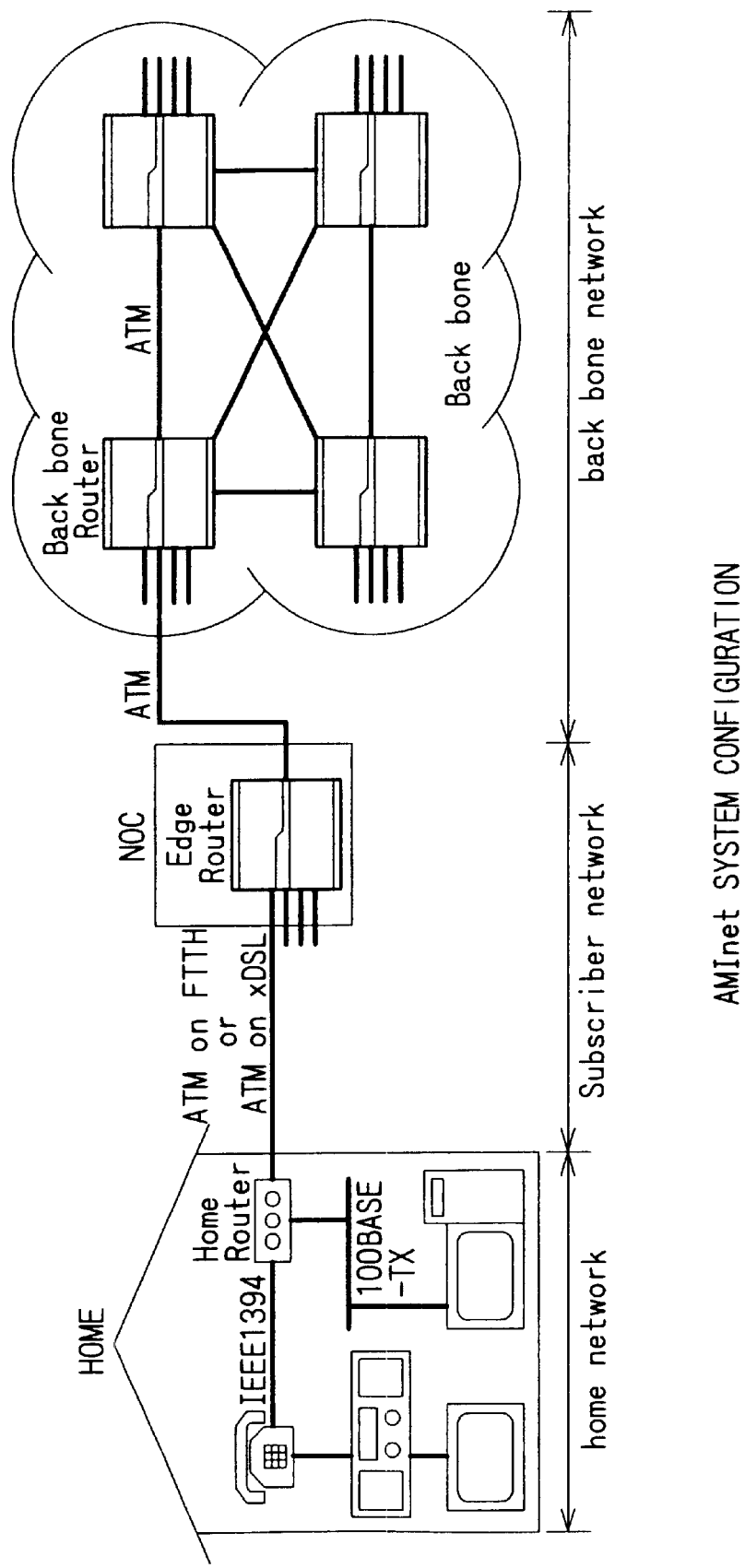
FIG. 2 is a schematic diagram illustrating an example of a system configuration of the AMInet architecture.

The following describes an AMInet system configuration. AMInet considers not only a wide area network but also a home network. A system configuration supposed by the AMInet project is shown in FIG. 2. As shown in the figure, the entire network is composed of three portions of a backbone network, a home network, and a subscriber network.

FIG. 2 shows an example of the AMInet system configuration. For the backbone, one as large-scale as covering entire Japan is supposed, utilizing the ultra-high-speed communication technologies of ATM. An ATM network providing the backbone is constituted by ATM switches (and optical fiber). of the ATM switches, one that is an AMInet-unique functional extension such as high-speed signaling is referred to as a backbone router.

Around the backbone, edge routers are arranged. The edge router is an AMInet-unique functional extension of the ATM switch like the backbone router. The edge router is located so that it concentrates subscriber lines and connect them to the backbone. The edge router also bills subscribers and shapes the traffic from the home network to the backbone. The subscriber lines are possibly of optical fiber by FTTH or possibly supported by such technologies as copper-wire-based ADSL (Asymmetric Digital Subscriber Line). In either case, the ATM network is considered to reach each connected home.

Each connected home is installed with a home router. The home router is supposed to have ATM as external network interface and IEEE 1394 or Ethernet (10 Mbps/100 Mbps) as internal network interface. IEEE 1394 is capable of assuring QoS such as band allocation, so that it has an advantage that QoS-assured communication can be performed between end nodes. In the future, AV equipment is expected to have IEEE 1394, so that not only computers but also AV equipment will be connected to a network.

The following describes the realization of the real-time communication based on the integration of ATM and IP in AMInet (ATM Control through IP for Real-Time Communication in AMInet). Described in the following are a backbone assumed by the AMInet project and a resource reservation setup protocol ASP (AMInet Setup Protocol) for use in a wide area network for connecting home users. ASP focuses attention to the flexibility and adaptability of IP and ATM, which is a line-oriented data link, and integrates IP and ATM to realize high-speed and flexible resource reservation. ASP does not use ordinary ATM signaling but uses a message to be transferred by IP to dynamically establish an ATM VC. In the following, features of ASP, current prototype implementation, and integration with QoS routing will be described.

Advancement in FTTH (Fiber to the Home) and xDSL (Digital Subscriber Line) technologies will realize the use of a non-dialup, constantly connected high-speed network at home. In such an environment, applications such as Integrated Services (IS) and transfer of large-capacity files must be realized efficiently. Especially, for the realization of IS, resource reservation is effective. Introduction of resource reservation allows a network to assure QoS (Quality of Service). Besides, in the case of a bulk data transfer application, the TCP capability can be extended to efficiently use a network itself.

The following describes AMInet setup protocol (ASP) for resource reservation in AMInet that provides a wide area high-speed network environment. In order to provide a resource reservation capability, ASP effectively integrates the ATM VC technology and IP. ASP also supports high-speed resource reservation and dynamic QoS change and considers integration with QoS routing.

The following describes resource reservation. In the Internet, resource reservation for supporting IS will become essential. The introduction of resource reservation introduces the concept of connection into the Internet originally based on packet exchange. Consequently, use of ATM as a data link is good in integrity and facilitates the assurance of QoS by ATM.

AMInet also pays attention to ATM and consequently handles it as one of data links. Herein, the description is made about an implementation mainly achieved by use of ATM. Currently, the IETF (Internet Engineering Task Force), organization for standardization of the Internet, is standardizing the proposed standard with RSVP (Resource Reservation Protocol) as a resource reservation protocol. In the case of RSVP, the currently specified Internet draft assumes a form using an SVC (Switched Virtual Channel) of ATM. Therefore, a VC (Virtual Channel) must be established by use of ATM signaling. However, because the current signaling processing is loaded and takes time, making it highly possible to inversely affect both application and network. To solve this problem, some systems have been proposed in which the processing necessary for signaling is divided for concurrent processing.

In addition, researches are being performed into mitigating the overhead due to crankback by performing resource reservation along plural routes simultaneously. Currently, with commercially available ATM switches, use of an SVC puts the signaling processing time to an order at which it cannot be used in ordinary IP data communication. This is mainly because ATM switching is designed with reference to voice data, that is, the connection establishing time in the conventional telephony. Besides, the use of the current signaling alone cannot dynamically change QoS.

In order to solve the above-mentioned problems, AMInet uses highly flexible IP for setup message transfer to directly establish an ATM VC, ensuring QoS.

ASP (AMInet Setup Protocol) is a resource reservation setup protocol that operates in a wide area network, especially an environment constituted by routers based on the AMInet architecture. AMInet has routers having the ATM switching capability and it is constituted by a backbone and edge routers arranged on the border thereof. Resources to be reserved include an ATM VC or a queue to be used for packet processing. Especially, in the case of the integration with ATM, ordinary ATM signaling is not used, but establishing a VC in an ATM switch or a router having the ATM capability. A setup message is transferred by use of IP, so that high-speed resource reservation can be realized. Therefore, normally, a VC which is called a SVC in ATM switching is not used at all. A VC is dynamically established by a message that uses IP. Such a VC is referred to as a PVC-on-demand. Use of ASP can dynamically establish or disconnect a VC in a manner different from an ordinary SVC.

If ASP is used, data is transferred by ordinary IP and IP packet is mapped on the specific reserved resource. Therefore, ASP can easily be made compatible with new applications that may emerge in the future. The mapping from conventional applications into new applications is performed by referencing source and destination IP addresses, source and destination port numbers, and protocol identification fields. An ordinary IP traffic, namely a best effort traffic (BE) is transferred through a preset default BE VC. The resources reserved by use of ASP are not affected by a BE traffic. Flows bundled into one VC taking account of resource saving for example are not affected by a BE traffic, being able to coexist.

Next, a flexible setup system wiil be described. In ASP, resources can be reserved in various forms for efficient resource utilization or making reservations in accordance with application requests. In the Internet and an ATM environment, various types of applications are encountered. They range from broadcast type to interactive type in which data is transmitted bidirectionally, including TV conference, remote diagnostics, video on demand (VoD), and multicast application using M-bone. In each type, the QoS parameters must be mapped into the resource reservation parameters on a lower layer efficiently and in a scalable manner.

For example, in the case of VoD, a VC needs not be established bidirectionally between a server and a client. This is because data always flows from the server to the client. If ASP is used, exchanging of ASP-unique messages, exchanging of control other than data transfer required by application (in the case of VoD, a request from client for changing movies to be viewed), and exchanging required by a higher layer (for example, the transport layer) may be performed by a dedicated VC but may alternatively performed by use of the default BE VC alone. The ASP messages are transferred through the default BE VC or a specified dedicated VC.

On the other hand, in the case of an interactive-type TV conference application, a bidirectional VC is required. ASP is compatible with both unidirectional and bidirectional types. In the case of interactive type, an asymmetric model in which different QoSs can be set to upstream and downstream traffics.

Like RSVP or ST-2+ (Stream Transport Protocol-2+), ASP allows a resource reservation request to be issued from the receiving side as well as the sending side. There are both cases in which the sending side has the QoS information necessary for resource reservation and the receiving side has that information. In either case, ASP allows all reservations to be set by one pass. Further, as required, each side may have a response message indicative of the completion of reservation.

Figure 3:
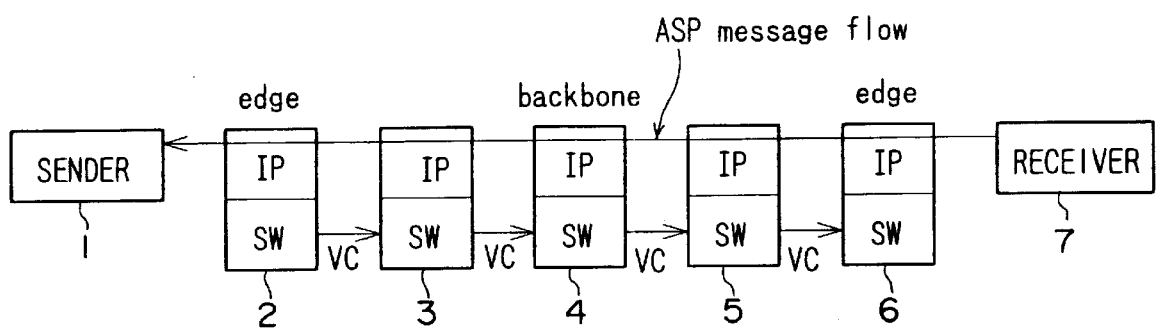
FIG. 3 is a schematic diagram illustrating a state in which a receiver is issuing a resource reservation request message.

FIG. 3 shows an example in which a general resource reservation request message is issued by the receiving side. This indicates the case in which a broadcast-type application of video for example uses ASP. Namely, data is transferred only in the direction from a server (sender) 1 to a client (receiver) 7.

The receiver 7 first interprets a QoS parameter, determines a VPI/VCI to be used by this connection, and, as required, sets an ATM NIC (Network Interface Card). In addition, the receiver 7 generates an ASP message including this information and transfers the generated ASP message to an edge router arranged adjacent to the backbone. This message is transferred by IP to be processed for every IP hop. In the example of FIG. 3, when the message has reached the edge router, the edge router sets the VPI/VCI parameter toward the receiving side. The VPI/VCI is controlled at each node independently. Thus, the ASP message is transferred upstream toward the sender 1. At routers 2 through 6, VCs are set in the direction opposite to the transfer direction of this message. Although not shown in the figure, when the message has been transferred to substantially complete the reservation, a reply message is transferred from the receiver 7 as required. At this point of time, at least in the backbone, the VC is established in the direction from the sender 1 to the receiver 7. Namely, use of this VC connecting the edges cuts through IP at data transfer, allowing communication by ATM alone.

FIG. 3 illustrates only one form of the flexible setup in ASP. For example, if only the sender 1 has QoS information and a reservation request is issued from the receiver 7 by multicast application, a message can be generated such that VC setting is made in a second pass in which the reply in the above-mentioned example is returned. Further, bidirectional VCs may also be established only in the first pass.

Next, dynamic QoS changing will be described. In ASP, an ATM VC is established by the unique setup system. Therefore, no other VCs need be prepared beforehand to dynamically change the QoS of an already reserved resource. Besides, the service level of an application can be upgraded with ease. For example, in simple shifting from BE to IS, the data flow can easily be remapped from the default BE VC into a new VC shown in FIG. 3.

Integration with QoS routing is performed as follows. In ASP, routing selection support by QoS routing at VC setup is considered. To be specific, when reserving a resource, a routing table at a conventional IP level is not used but routing information is provided by a module that controls a unique routing table for the flow that requires IS. This allows use of a different route for each flow according to the QoS request and the availability of resource in the network.

The related art resource reservation protocol and the routing system have been considered to be independent of each other. ASP aims at integration with QoS routing. This integration is performed by feeding back resource reservation information held by ASP to the module of QoS routing. This facilitates selection of an alternate route if reservation fails. In addition, this can distributes a resource to be reserved throughout the network, resulting in efficient utilization of the entire network without concentrating resource reservations on one route.

Figure 4:
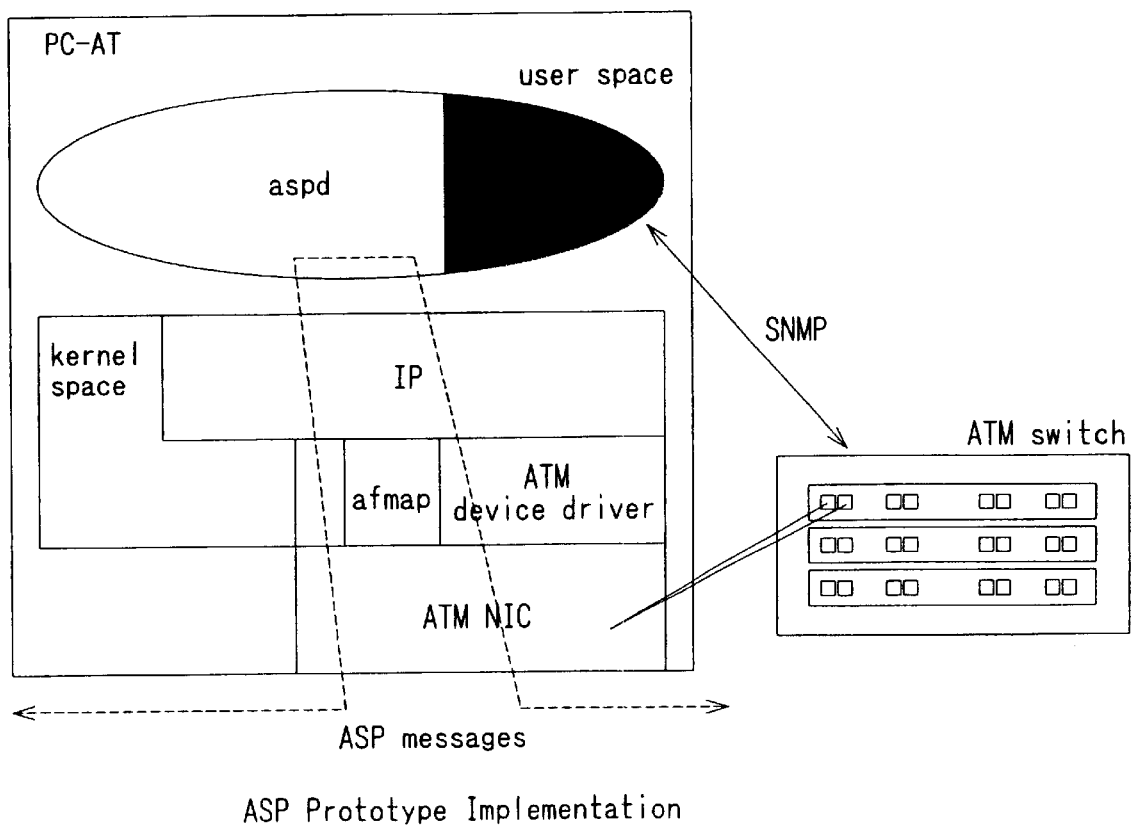
FIG. 4 is a schematic diagram illustrating an example of a prototype configuration of ASP.

Prototype implementation is performed as follows. ASP is installed in a user space as a UNIX daemon process (aspd). The prototype is operating in free BSD 2.2.1 and is integrated with the library (swctl lib) for controlling ATM switch and the module (afmap) for setting ATM NIC (refer to FIG. 4). Currently, three types of routers are supported. The home router has ATM interface with 100 Base-T Ethernet. The edge router is currently implemented as a router having plural ATM interfaces. The backbone router comprises an ATM switch and a PC that includes an IP engine for controlling the ATM switch. The current prototype uses the ATM interface cards for PCI bus manufactured by Adaptec and Efficient Networks and a Fore ASX-200WG ATM switch. An ASP message is installed by use of raw IP.

The backbone router uses the above-mentioned switch control library to set PVC-on-demand in the equipped switch. The IP flow that requires IS is mapped into a VC of CBR. Currently, ASP is compatible with multicast by generating a multicast VC of one-to-many by an ATM switch. Also, ASP supports join by leaf and resource reservation.

If the scalability of ATM resources including an identifier such as VCI is taken into consideration, it is inefficient to map IP flows into a VC on an application basis. Use of ASP facilitates to dynamically integrate flows into a VC. However, the criterion for this integration must be examined in the future.

Lastly, the QoS routing module is currently under design. The effectiveness of the module is being examined through simulation.

Figure 5:
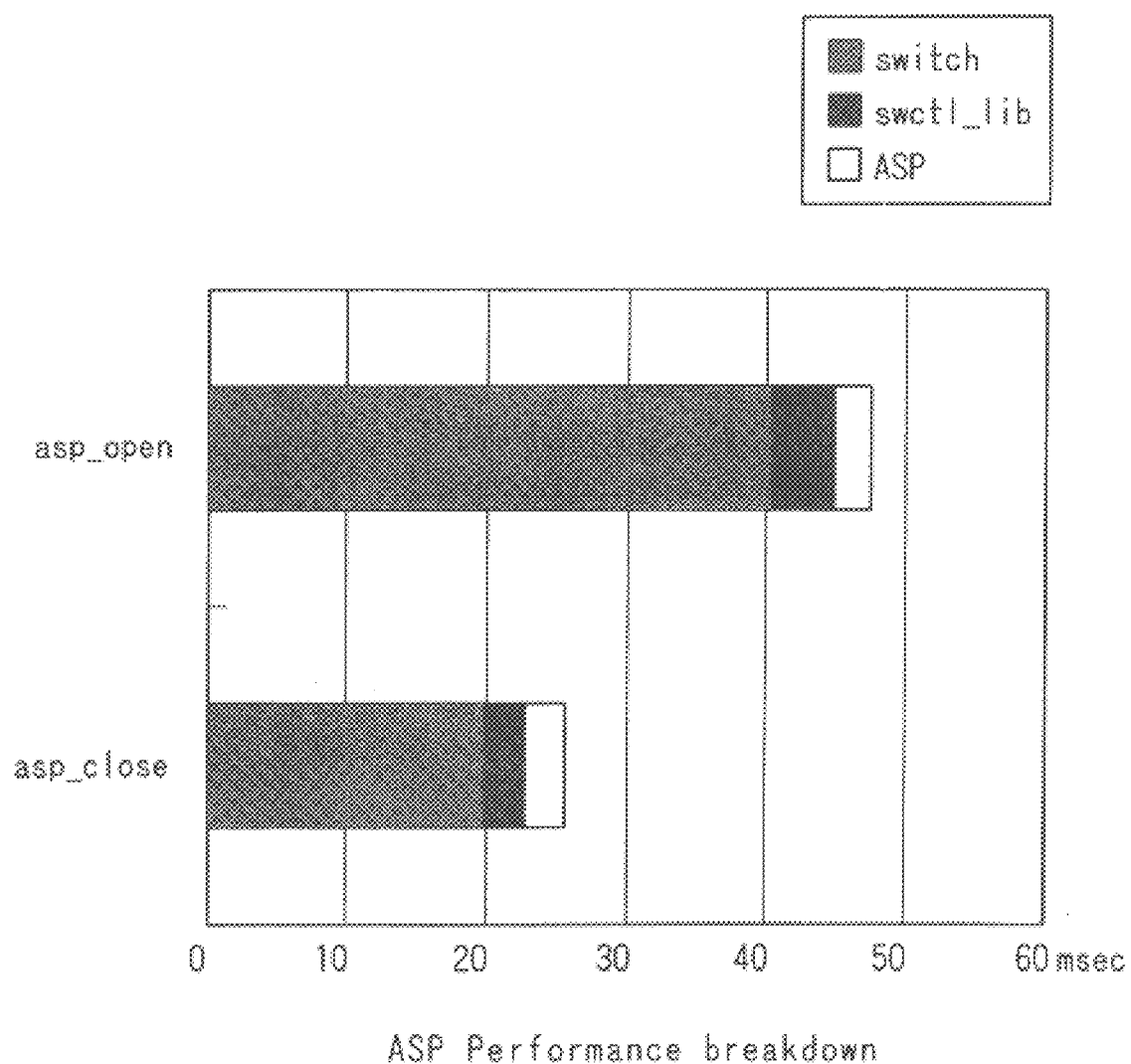
FIG. 5 is a graph illustrating performance of establishment and release of resource reservation in the current implementation of ASP.

Next, the performance of the prototype will be described. FIG. 5 shows the performance of establishment and release of resource reservation in the current implementation of ASP. "asp_open" indicates a time from the issuance of a resource reservation request to the normal end of the reservation (including a time of waiting for the reply indicative of successful reservation). "asp_close" indicates a time required for releasing the reservation. The measurements of these times indicate the case in which each request has been issued for unicast communication from the receiver with one router arranged between the single sender and the single receiver. The sender and the receiver have an ATM NIC respectively. The time indicated as ASP in the figure includes a time required for performing the processing necessary for ASP and mapping the flow into the NIC. "swctl_lib" indicates a processing time required by the above-mentioned ATM switch control library. "switch" indicates a time necessary for setting the ATM switch by SNMP by use of the ATM switch control library.

As seen from FIG. 5, most of the overhead is due to the processing for setting the ATM switch by SNMP (indicated by "switch"). Depending on the switch, the time necessary for this processing is fairly unstable, scattering between 40 msec and 110 msec. Even if this time is stable, it takes at least 40 msec to 50 msec. The switch used for this time is not designed for such unstable operations. Besides, the specifications of the internal structure of the switch have not been made public, so that these unstable operations cannot be examined. Consequently, the SNMP processing in the switch or the VC setup processing or both may be slow. The current performance can process only 20 to 25 VCs per second. However, if the speed of the processing in the switch can be increased, significant performance enhancement would result. Currently, integration of ASP with hardware is under examination. When this integration is completed, several hundred VCs may be set per second.

So far, resource reservation protocol ASP in AMInet has been described. ASP introduced a unique setup system and integrated IP flexibility with the QoS assurance based on ATM VC. Consequently, it has been proved that dynamic QoS change, integration with QoS routing, and flexible setup can be provided, realizing high-speed setup by prototype implementation. In the future, the prototype will be integrated with unique switch hardware and flow aggregation and QoS routine will be installed.

Next, ASP, the protocol for resource reservation in AMInet, will be described. As described before, ASP stands for AMInet Setup Protocol. "Setup" herein denotes setting the state/information for resource reservation at the receiver, the sender, or a router passed in routing.

ASP abstracts as a resource the class of queue allocation (CBQ: Class Based Queueing) that can be provided by a lower-layer VC having line exchange capability or by a packet scheduler and makes correspondence such that the data flowing through an IP network is transferred without being affected by other data. To be specific, ASP of the current prototype implementation abstracts an ATM VC and UPC control as resources, reserves these resources, and brings the VC in correspondence with the flow of IP. The flow herein means information that follows: "address family," "protocol," which is a protocol identifier, destination and source IP addresses, and destination and source port addresses.

The ASP setup, namely the exchange of ASP protocol messages is installed in IP. Therefore, when generating an ATM VC on demand, a signaling system actually prepared by ATM need not be used. This freedom provides flexible and efficient resource reservation.

In addition, ASP has capabilities equivalent mainly to those of RSVP and ST-2. ASP corresponds to ATM VCs with flexibility and provides the following capabilities; both receiver-controlled resource reservation and sender-controlled resource reservation, flexible setup with ATM VC considered, and allocation of band (resource) dedicated to protocol control (reservation control).

Figure 6:
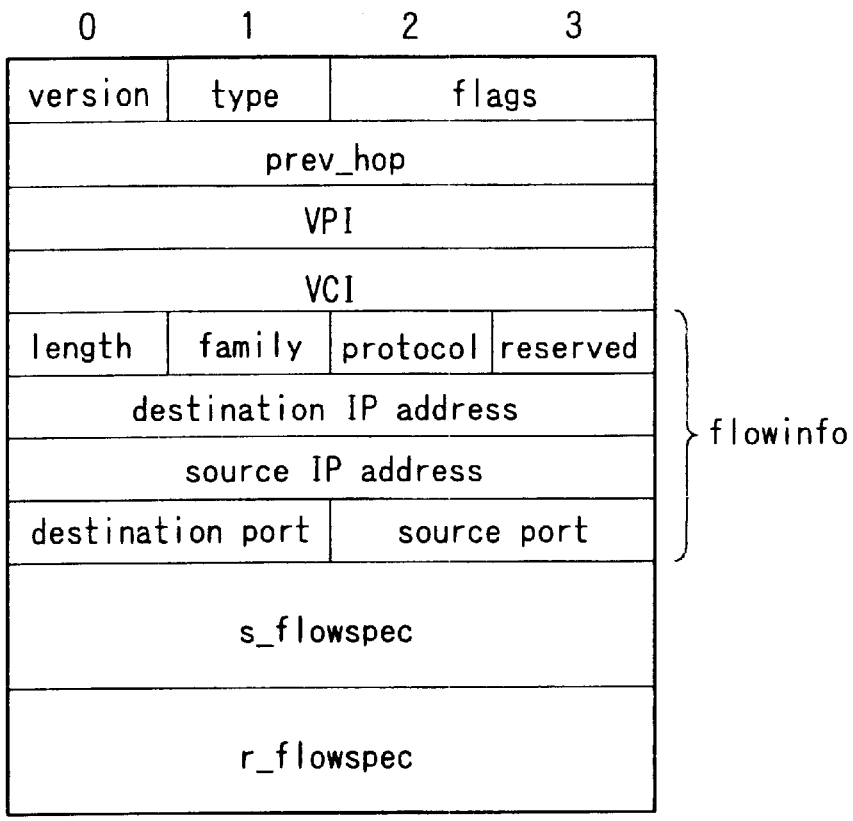
FIG. 6 is a diagram illustrating an example of a format of the header of ASP.

FIG. 6 illustrates an ASP header format by way of example. Field "flags" specifies information for indicating whether the direction in which a resource is reserved is unidirectional or bidirectional. Field "prev-hop" specifies information for enabling messages to be exchanged between sender and receiver to pass along a same route. Field VPI specifies a VPI (Virtual Path Identifier). Field VCI specifies a VCI (Virtual Connection (or Channel) Identifier). Field "flowinfo" specifies the above-mentioned flow information.

Next come fields "s_flowspec" and "r_flowspec." Field "s_flowspec" specifies QoS necessary for the data to be sent by the sender. Field "r_flowspec" specifies QoS necessary for the data to be sent from the receiver. In the current prototype, each flowspec field includes only PCR (Peak Cell Rate) for setting CBR (Constant Bit Rate) service of ATM. Details will be described later.

Figure 7:
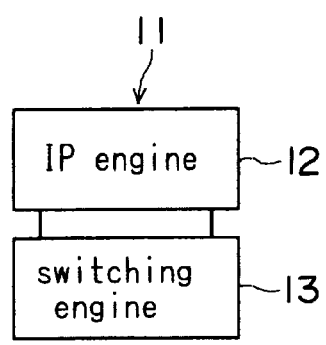
FIG. 7 is a diagram illustrating an example of the configuration of a backbone router.
Figure 8:
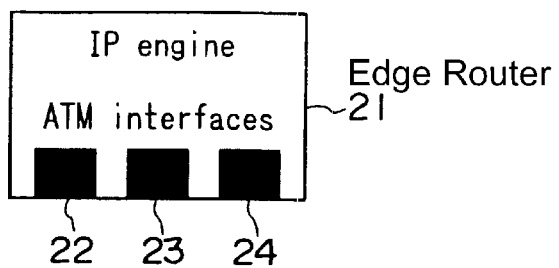
FIG. 8 is a diagram illustrating an example of the configuration of an edge router.

Currently, the routers of the form for installing ASP include the backbone router as shown in FIG. 7, the edge router as shown in FIG. 8, and the home router. In addition, an end host needs to exchange ASP messages.

A backbone router 11 is an intermediate node for constituting a large-scale network and composed of a software engine (IP engine) 12 (a relay means) for interpreting TCP/IP and a switch section (switching engine) 13 (a resource reservation means) (an ATM switch in the prototype). Namely, connection between each backbone router constitutes an ordinary IP network. Besides, VC setting enables cut-through.

An edge router 21 is arranged at a port of a network constituted by plural backbone routers. The opposite side of the backbone may be connected to another network or another router. The edge router 21 has an ordinary IP and more than one ATM interfaces 22 through 24.

Figure 9:
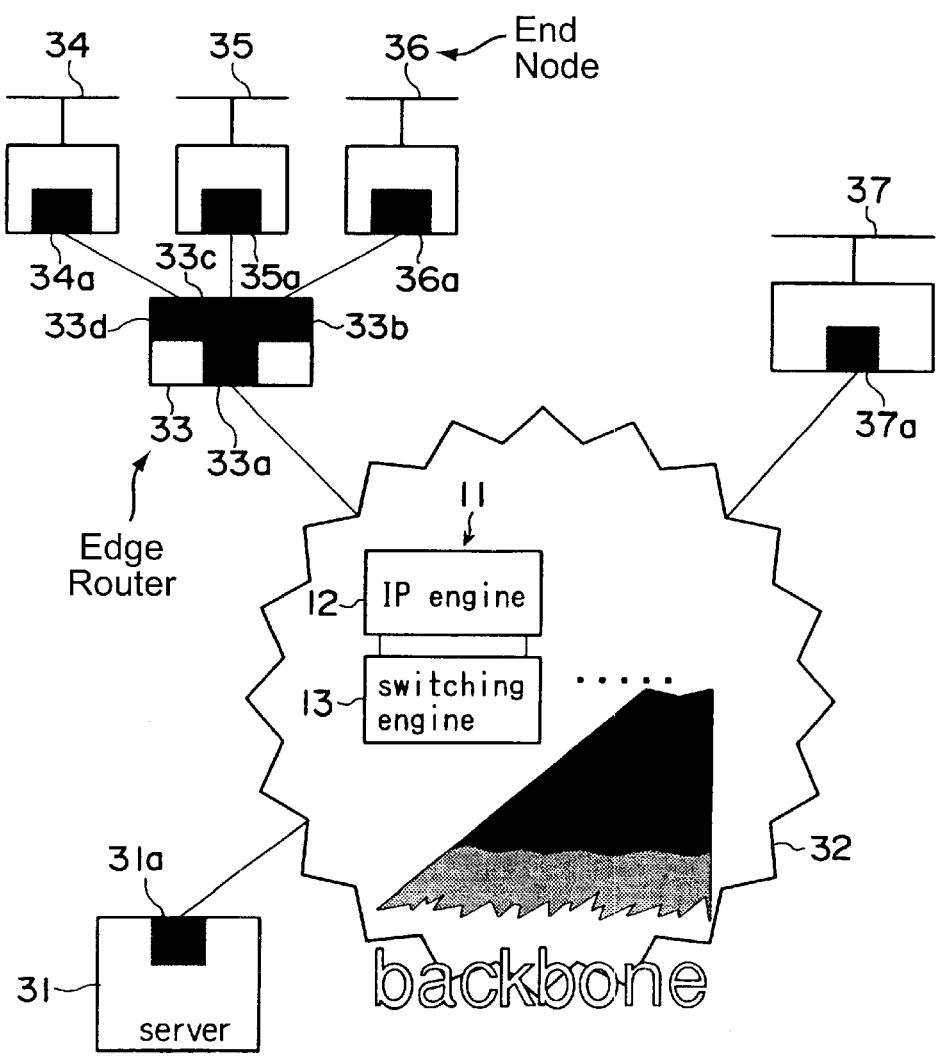
FIG. 9 is a schematic diagram illustrating an example of the configuration of a network.

FIG. 9 illustrates a connection example of an entire network. As shown in the figure, connecting servers (sending terminals) 31 and 37 for sending a large capacity of data through the network directly to a backbone 32 composed of plural backbones 11 does not cause a problem. Ordinary end nodes 34 through 36 are connected to the backbone 32 through an edge router 33. A router may be arranged beyond the edge router 33. The end node (receiving terminal) 34 is connected to the edge router 33 through an ATM interface 34a (sending means). The end node (receiving terminal) 35 is connected to the edge router 33 through an ATM interface 35a (sending means). The end node (receiving terminal) 36 is connected to the edge router 33 through an ATM interface 36a (sending means).

Important for ASP are resources to be reserved by each router and a method of the reservation. In the backbone router, VC setting in the switch is required. At the entrance in which data flows into the backbone, mapping must be performed on the VC (resource) that newly generated a particular flow. Normally, this is done by an edge router. If a server is directly connected to the backbone, the mapping must be performed by the ATM interface correspinding to the backbone of that node.

Figure 10:
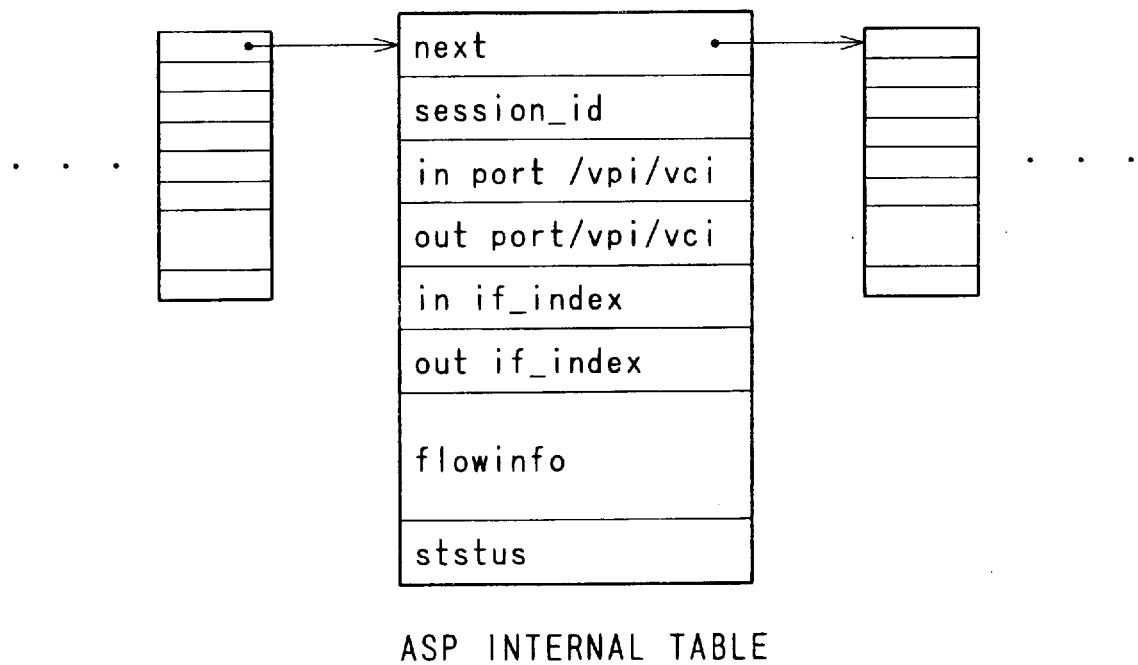
FIG. 10 is a diagram illustrating an internal table of ASP.

The ASP module of each node maintains a status table for controlling a resource reservation status as shown in FIG. 10. This table controls the information about input VC and the information about output VC, thus it brings the VCs into correspondence with flows (flowinfo). Each edge router requires the information about input and output network interfaces, so that the fields for the information are provided. In this case, the port section corresponding to VC information is not used any more.

To perform normal communication, IP communication for example, the VC of ATM must be generated bidirectionally. However, use of ASP can establish the VC with flexibility.

In some applications, communication is differed by applications, either unidirectional or bidirectional. For example, in an application associated with VoD (Video on Demand), video data flows only unidirectionally, from server (sender) to client (receiver). Communication is possible in which data is sent to the server when the receiver requests the server for image data. For example, resource reservation messages are exchanged through a dedicated VC by requesting ASP. Other necessary exchanges flow through a default data VC (normal IP route). Therefore, in such a case, an application that requires ASP for resources may only set unidirectional VCs by specifying unidirectional communication, thereby saving identifiers and bandwidth. Also, this reservation method is sufficient enough for broadcast-side multicasting.

However, in an interactive application such as video conference, data flows bidirectionally. Such bidirectional data flow is the same as normal communication. When ASP is used, the application can set different QoSs to data flowing in each direction. This setting is made based on the values (s_flowspec and r_flowspec) of the two flowspec fields in the ASP header. If NULL value is contained in any of the flowspec fields, the VC in that direction is not reserved.

FIG. 11 illustrates a procedure in which a unidirectional VC is established if a RECEIVER (receiving terminal) 47 (sending means) knows QoS. Namely, the RECEIVER 47 sets a value, for example 0, indicating that VC establishment is made unidirectionally, to the field "flags" of the ASP header and information indicative of bandwidth (for example, 5 Mbps (megabits/second)) of the VC to the field "s_flowspec" of the ASP header and sends the resultant message to a SENDER (sending terminal) 41 (sending means). As the ASP message flows from the RECEIVER 47 to the SENDER 41, the VC is established at each router in the direction opposite to the ASP message flowing direction.

First, an edge router 46 (resource reservation) establishes the VC in the direction opposite to the ASP message flowing direction. Likewise, VCs in the direction opposite to the ASP message flowing direction are established at the backbone routers 45, 44, and 43 (resource reservation means) and the edge router 42 (resource reservation means) in this order. At this moment, in the SWs (switching engines) constituting the backbone routers 43 through 45, a predetermined input port thereof is connected to a predetermined output port thereof to establish the above-mentioned VC.

FIG. 12 illustrates a procedure in which VCs are set when only the sender knows QoS. First, the RECEIVER 47 sends an ASP message with NULL set to the field "s_flowspec" of the ASP header to the SENDER 41, requesting VC establishment. Receiving this ASP message, the SENDER 41 interprets the message and returns an ASP message with a value corresponding to a predetermined bandwidth set to the field "s_flowspec" of the ASP header to the RECEIVER 47. At each router, the VC is set in the same direction as that in which this ASP message flows.

Namely, the VCs are set in the same direction as the ASP message flowing direction at the edge router 42, the backbone routers 43, 44, and 45, and the edge router 46 in this order.

Figure 13:
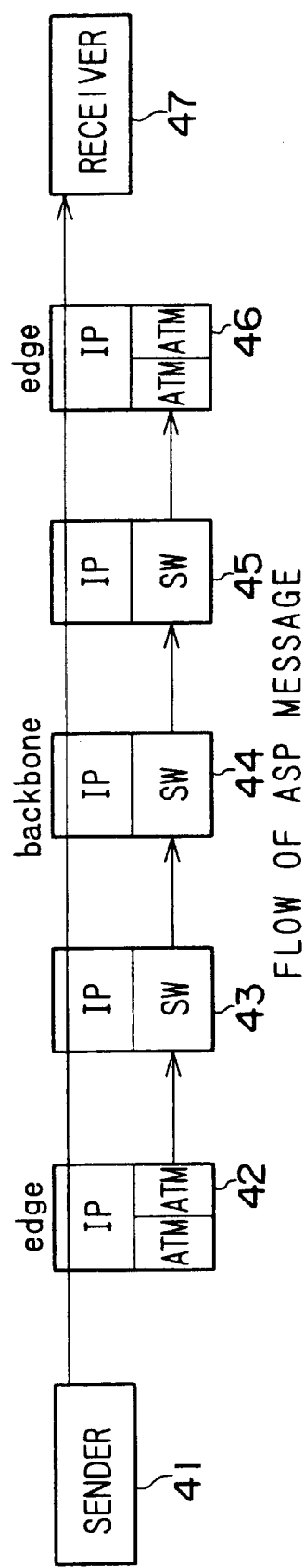
FIG. 13 is a diagram illustrating still another ASP message flow and still another procedure in which VC establishment is performed.

FIG. 13 illustrates a procedure in which VCs are set when the SENDER 41 starts reservation. In this case also, as an ASP message flow in one direction, VC establishment is performed at each router. To be more specific, the SENDER 41 sends an ASP message with a value corresponding to a predetermined bandwidth set to the field s_flowspec of the ASP header to the RECEIVER 47. Based on this ASP message, the VC is established at the edge router 42 in the same direction as the ASP message flowing direction. Then, the VCs are established at the backbone routers 43, 44, and 45 and the edge router 46 in this order.

In most cases, unless the completion of reservation is confirmed, the sender cannot send data. Therefore, although not shown, an ASP message for confirmation is sent from the RECEIVER 47 to the SENDER 41.

Figure 14:
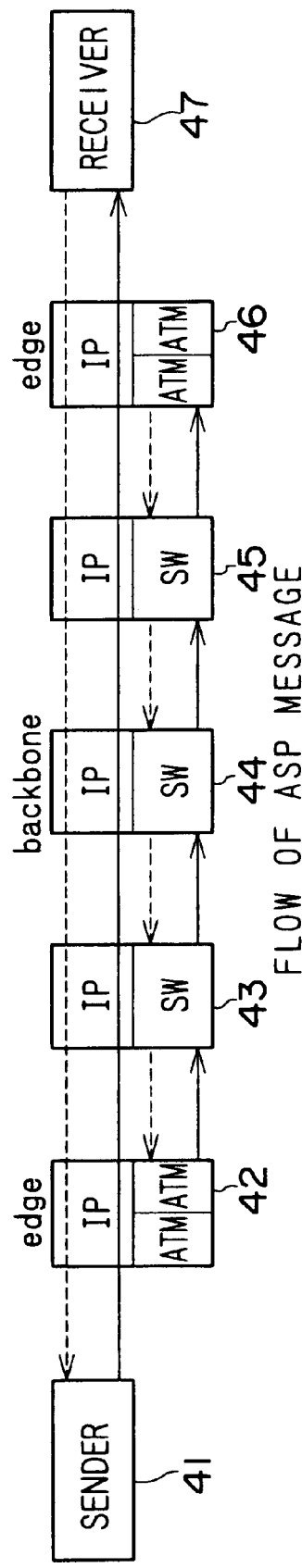
FIG. 14 is a diagram illustrating yet another ASP message flow and yet another procedure in which VC establishment is performed.

FIG. 14 illustrates a procedure in which bidirectional communication is performed when both the sender and the receiver know QoS necessary for sending data. In this case, as ASP messages (reservation messages) flow in both directions, the VCs are set in both directions.

To be more specific, the SENDER 41 sends an ASP message with a value corresponding to the bandwidth of the downward-going (from the SENDER 41 to the RECEIVER 47) VCs set to the field "s_flowspec" of the ASP header to the RECEIVER 47. This establishes the downward-going VCs in the same direction as the ASP message flowing direction at the edge router 42, the backbone routers 43, 44, and 45, and the edge router 46 in this order.

On the other hand, the RECEIVER 47 sends an ASP message with a value corresponding to the bandwidth of the VCs in the upward direction (from the RECEIVER 47 to the SENDER 41) set to the field "r_flowspec" of the ASP header to the SENDER 41. This establishes the upward-going VCs in the same direction as the ASP message flowing direction at the edge router 46, the backbone routers 45, 44, and 43, and the edge router 42 in this order.

As shown in FIG. 15, if both the sender and the receiver know QoS necessary when receiving data, as ASP messages (reservation messages) flow in both directions in the manner opposite to that shown in FIG. 14, the VCs are set in the direction opposite to the ASP message flowing directions.

To be more specific, the SENDER 41 sends an ASP message with a value corresponding to the bandwidth of the VCs in the upward direction (from the RECEIVER 47 to the. SENDER 41) set to the field "r_flowspec" of the ASP header to the RECEIVER 47. This establishes the upward-going VCs in the direction opposite to the ASP message flowing direction at the edge router 42, the backbone routers 43, 44, and 45, and the edge router 46 in this order.

On the other hand, the RECEIVER 47 sends an ASP message with a value corresponding to the bandwidth of the VCs in the downward direction (from the SENDER 41 to the RECEIVER 47) set to the field "s_flowspec" of the ASP header to the SENDER 41. This establishes the downward-going VCs in the direction opposite to the ASP message flowing direction at the edge router 46, the backbone routers 45, 44, and 43, and the edge router 42 in this order.

FIG. 16 illustrates a procedure in which VCs are established if the receiver knows QoS necessary for bidirectional communication. In this case, the bidirectional VCs are generated by one reservation message.

To be more specific, the RECEIVER 47 sets to the field "flags" of the ASP header a value, for example 1, indicating that VC establishment is performed bidirectionally. Then, the RECEIVER 47 sets to the field "s_flowspec" of the ASP header a value corresponding to the bandwidth of the downward-going VCs and to the field "r_flowspec" a value corresponding to the bandwidth of the upward-going VCs and sends the ASP message including this ASP header to the SENDER 41. Thereby establishing at the edge router 46 the upward-going VCs having the bandwidth set to the field "r_flowspec" and the downward-going VCs having the bandwidth set to the field "s_flowspec." Next, at the backbone routers 45, 44, and 43, and the edge router 42 in this order, the upward-going VCs having the bandwidth set to the field "r_flowspec" and the downward-going VCs having the bandwidth set to the field "s_flowspec" are established.

Thus, VC establishment can be performed in a variety of methods. In addition, a constitution may be formed so that a higher layer can select any of these methods, thereby providing an efficient setup system that is suitable for applications.

So far, ASP has been described in which ATM and IP are integrated to set up VCs on demand without use of ATM signaling. The following describes a system in which the relationship between VC (resource) and flow is dynamically changed by use of ASP capabilities. Currently, data for VC sinks from the edge router to the receiver, namely the data cuts through. Therefore, the data goes via the switches of plural backbone routers, directly going through the ATM VCs up to the edge router of the receiver.

Paying attention to the sinking of the data at the edge router, an ASP message may be issued such that feedback is applied to this point, thereby migrating existing communication that uses VCs to the already generated VCs without affecting the communication. Namely, during communication, VCs can be changed at the entrance to the backbone to dynamically change the midway route for example.

The following describes advantages to be obtained by incorporating the above-mentioned system into ASP. This system is not limited to ASP but effectively applicable to the interlocking with RSVP for example.

For example, in the case of ATM signaling, after completion of VC setup, it is difficult to change the route. This is because the VCs must be set end-to-end again. On the other hand, RSVP is regarded as advantageous in robustness and adaptation to environment. However, if RSVP complies with current IP routing, RSVP may not be suitable for real-time communication because route change occurs. To solve this problem, RSVP introduces route pinning, disabling the change by routing for an explicitly reserved route.

Use of the method proposed herein can easily change routes if communication is on. In addition, QoS routing for example can be introduced to easily permit route change that is otherwise not allowed.

Further, flows reserved during communication can be integrated into a predetermined VC during communication. Resources such as VCI can be saved. Still further, reservations of an organization, an application, and so on can be integrated.

If there are plural communication paths for a predetermined destination and communication of a new session for example requires a resource capacity of a certain degree, routes/resources of other sessions can be collected.

The resource reservation status of a session in communication can be changed dynamically.

Although attention is herein paid to the edge router especially, the present system can also be implemented in the backbone router. For implementation, when the VCs for remapping a flow in question have been prepared, this changeover is performed by the edge router at high speeds. An equivalent operation may also be performed by the backbone router. However, it is more difficult to gather the information necessary for this operation and it is not desirable to complicate the capabilities of the backbone router itself by providing such a system.

For the edge routers, it is practicable to grasp to a certain degree the number of terminals collected at the end side or the number of home routers, so that proper routing can be performed accordingly. Namely, compared to the backbone router, information gathering is limited and therefore simple with the edge routers.

In this method, it should be noted that an edge router operation affects the data that flows. First, changing over sending VCs may cause a loss in the data to be sent. In addition, at the edge router on the receiver side, data is sent from two VCs temporarily, so that the receiver may receive the data in duplication. To ensure data correctness in such situations, use of a highly reliable transport protocol is desired.

It should be noted that, in the above-mentioned preferred embodiment, an example of VC reservation has been described, the present invention is also applicable to the reservation of other resources such as UPC (Usage Parameter Control) and so forth.

As described and according to the network resource reservation control method and the network resource reservation control apparatus, a message is sent composed of first information for specifying, as a direction in which the resource reservation is performed, one of unidirectional communication in which the resource reservation is performed in a first direction from the sending terminal to the receiving terminal, a second direction from the receiving terminal to the sending terminal, or bidirectional communication in which the fist direction and the second direction are combined, and second information for independently requesting resources in the first direction and the second direction. The resource requested by the second information is reserved in the direction specified by the first information of the message sent. Thus, this novel constitution allows efficient resource reservation independently of the direction in which the message is sent.

According to the receiving terminal, the sender sends a message to the sending terminal, the message being composed of first information for specifying, as a direction in which the resource reservation is performed, one of unidirectional communication in which the resource reservation is performed in a first direction from the sending terminal to the receiving terminal, a second direction from the receiving terminal to the sending terminal, or bidirectional communication in which the first direction and the second direction are combined, and second information for independently requesting resources in the first direction and the second direction. This novel constitution also allows efficient resource reservation independently of the direction in which the message is sent.

According to the sending terminal, the sender sends a message to the receiving terminal, the message being composed of first information for specifying, as a direction in which the resource reservation is performed, one of unidirectional communication in which the resource reservation is performed in a first direction from the sending terminal to the receiving terminal, a second direction from the receiving terminal to the sending terminal, or bidirectional communication in which the first direction and the second direction are combined, and second information for independently requesting resources in the first direction and the second direction. This novel constitution also allows efficient resource reservation independently of the direction in which the message is sent.

According to the relay apparatus, the relay relays a message composed of first information for specifying, as a direction in which the resource reservation is performed, one of unidirectional communication in which the resource reservation is performed in a first direction from the sending terminal to the receiving terminal, a second direction from the receiving terminal to the sending terminal, or bidirectional communication in which the first direction and the second direction are combined, and second information for independently requesting resources in the first direction and the second direction. The resource reserving system reserves the resource requested by the second information in the direction specified by the first information of the message relayed by the relay means. This novel constitution also allows efficient resource reservation independently of the direction in which the message is sent.

As many apparently different embodiments of this invention may be made without departing from the spirit and scope thereof, it is to be understood that the invention is not limited to the specific embodiments thereof except as defined in the appended claims.

What is claimed is:

1. A network resource reservation control method of controlling resource reservation between a sending terminal for sending data and a receiving terminal for receiving said data through a network, comprising the steps of:

sending a message composed of first information for specifying, as a direction in which said resource reservation is performed, one of unidirectional communication in which said resource reservation is performed in one of directions including a first direction from said sending terminal to said receiving terminal, a second direction from said receiving terminal to said sending terminal, and bidirectional communication in which said first direction and said second direction are combined and second information for independently requesting resources in said first direction and said second direction; and reserving the resource requested by said second information in the direction specified by said first information of said message sent in the sending step.

2. The network resource reservation control method as claimed in claim 1, wherein said message is sent in one of directions from said receiving terminal to said sending terminal and from said sending terminal to said receiving terminal.

3. The network resource reservation control method as claimed in claim 1, wherein a direction in which said resource reservation is performed is specified independently of the direction in which said message is sent.

4. The network resource reservation control method as claimed in claim 1, wherein said message is sent from said sending terminal to said receiving terminal to reserve the resource requested by said message.

5. The network resource reservation control method as claimed in claim 1, wherein said message is sent from the receiving terminal to said sending terminal to reserve the resource requested by said message.

6. The network resource reservation control method as claimed in claim 1, wherein said network is an ATM (asynchronous transfer mode) network.

7. The network resource reservation control method as claimed in claim 1, wherein the steps of sending and receiving are AMInet setup protocol compliant.

8. The network resource reservation control method as claimed in claim 1, wherein said network is an AMInet network.

9. A network resource reservation control apparatus for controlling resource reservation between a sending terminal for sending data and a receiving terminal for receiving said data through a network, comprising:

a sending means for sending a message composed of first information for specifying, as a direction in which said resource reservation is performed, one of unidirectional communication in which said resource reservation is performed in one of directions including a first direction from said sending terminal to said receiving terminal, a second direction from said receiving terminal to said sending terminal and bidirectional communication in which said first direction and said second direction are combined and second information for independently requesting resources in said first direction and said second direction; and a resource reserving means for reserving the resource requested by said second information in the direction specified by said first information of said message sent by said sending means.

10. The network resource reservation control apparatus as claimed in claim 9, wherein said network is an ATM (asynchronous transfer mode) network.

11. The network resource reservation control apparatus as claimed in claim 9, wherein the network is an AMInet network.

12. A receiving terminal for receiving data from a sending terminal through a network, said receiving terminal having a sending means for sending a message to said sending terminal, said message being composed of first information for specifying, as a direction in which said resource reservation is performed, one of unidirectional communication in which said resource reservation is performed in one of directions including a first direction from said sending terminal to said receiving terminal, a second direction from said receiving terminal to said sending terminal and bidirectional communication in which said first direction and said second direction are combined and second information for independently requesting resources in said first direction and said second direction, said receiving terminal having a receiving means for receiving said message from said sending terminal.

13. A sending terminal for sending data to a receiving terminal through a network, said sending terminal having a sending means for sending a message to said receiving terminal, said message being composed of first information for specifying, as a direction in which said resource reservation is performed, one of unidirectional communication in which said resource reservation is performed in one of directions including a first direction from said sending terminal to said receiving terminal, a second direction from said receiving terminal to said sending terminal and bidirectional communication in which said first direction and said second direction are combined and second information for independently requesting resources in said first direction and said second direction, said sending terminal having a receiving means for receiving said message from said receiving terminal.

14. A relay apparatus for performing resource reservation between a sending terminal for sending data and a receiving terminal for receiving said data through a network to relay said data, comprising:

a relay means for relaying a message composed of first information for specifying, as a direction in which said resource reservation is performed, one of unidirectional communication in which said resource reservation is performed in one of directions including a first direction from said sending terminal to said receiving terminal, a second direction from said receiving terminal to said sending terminal and bidirectional communication in which said first direction and said second direction are combined and second information for independently requesting resources in said first direction and said second direction; and a resource reserving means for reserving the resource requested by said second information in the direction specified by said first information of said message relayed by said relay means.

15. A network resource reservation control method of controlling resource reservation between a sending terminal for sending data and a receiving terminal for receiving said data through a network, comprising the steps of:

sending via a first communication protocol a message composed of first information for specifying, as a direction in which said resource reservation is performed, one of unidirectional communication in which said resource reservation is performed in one of directions including a first direction from said sending terminal to said receiving terminal, a second direction from said receiving terminal to said sending terminal, and bidirectional communication in which said first direction and said second direction are combined and second information for independently requesting resources in said first direction and said second direction; and reserving via a second communication protocol resources of the network requested by said second information in the direction specified by said first information of said message sent via the first communication protocol in the sending step.

16. The network resource reservation control method as claimed in claim 15, wherein said message is sent in one of directions from said receiving terminal to said sending terminal and from said sending terminal to said receiving terminal.

17. The network resource reservation control method as claimed in claim 15, wherein a direction in which said resource reservation is performed is specified independently of the direction in which said message is sent.

18. The network resource reservation control method as claimed in claim 15, wherein said message is sent from said sending terminal to said receiving terminal to reserve the resource requested by said message.

19. The network resource reservation control method as claimed in claim 15, wherein said message is sent from the receiving terminal to said sending terminal to reserve the resource requested by said message.

20. The network resource reservation control method as claimed in claim 15, wherein the steps of sending and receiving are AMInet setup protocol compliant.

21. The network resource reservation control method as claimed in claim 15, wherein said network is an ATM (asynchronous transfer mode) network.

22. The network resource reservation control method as claimed in claim 15, wherein said network is an AMInet network.

23. A network resource reservation control apparatus for controlling resource reservation between a sending terminal for sending data and a receiving terminal for receiving said data through a network, comprising:

a sending means for sending via a first communication protocol a message composed of first information for specifying, as a direction in which said resource reservation is performed, one of unidirectional communication in which said resource reservation is performed in one of directions including a first direction from said sending terminal to said receiving terminal, a second direction from said receiving terminal to said sending terminal and bidirectional communication in which said first direction and said second direction are combined and second information for independently requesting resources in said first direction and said second direction; and a resource reserving means for reserving via a second communication protocol the resource requested by said second information in the direction specified by said first information of said message sent via the first communication protocol by said sending means.

24. The network resource reservation control apparatus as claimed in claim 23, wherein said network is an ATM (asynchronous transfer mode) network.

25. The network resource reservation control apparatus as claimed in claim 23, wherein said network is AMInet.

26. A relay apparatus for performing resource reservation between a sending terminal for sending data and a receiving terminal for receiving said data through a network to relay said data, comprising:

a relay means for relaying a message via a first communication protocol composed of first information for specifying, as a direction in which said resource reservation is performed, one of unidirectional communication in which said resource reservation is performed in one of directions including a first direction from said sending terminal to said receiving terminal, a second direction from said receiving terminal to said sending terminal and bidirectional communication in which said first direction and said second direction are combined and second information for independently requesting resources in said first direction and said second direction; and a resource reserving means for reserving via a second communication protocol the resource requested by said second information in the direction specified by said first information of said message relayed via the first communication protocol by said relay means.

* * * * *